United States Patent [19]

Watanabe

[11] 4,361,882
[45] Nov. 30, 1982

[54] SOUND REPRODUCING DEVICE INCORPORATING A DEVICE FOR SELECTING A DESIRED RECORD GROOVE

[76] Inventor: Katsumi Watanabe, 371 Ozenji, Tama-ku, Kawasaki-shi, Kanagawa-ken, Japan

[21] Appl. No.: 209,910

[22] Filed: Nov. 24, 1980

[30] Foreign Application Priority Data

Mar. 18, 1980 [JP] Japan .................................. 55-34435

[51] Int. Cl.³ .............................................. G11B 7/22
[52] U.S. Cl. .......................................... 369/30; 369/31
[58] Field of Search .............................. 369/30, 31, 65

[56] References Cited

U.S. PATENT DOCUMENTS 3,825,268 7/1974 Holland et al. ........................ 369/65
4,234,193 11/1980 Shiseki .................................. 369/31

Primary Examiner—Charles E. Phillips
Attorney, Agent, or Firm—Basile, Weintraub & Hanlon

[57] ABSTRACT

Before starting a sound reproduction, a distance between a record disc and a sound transmitting member which is disposed on a tone arm for pushing the tone arm, is held by a movable blade of an electromagnetic actuator.

When a rotary switch attached beneath the record disc rotates by the rotation of the record disc and contacts one of a plurality of fixed contacts which have been positioned to satisfy a predetermined locational relationship with respect to a portion on which the pickup descends before it enters the starting point of the selected record groove, the electromagnetic actuator is energized to release its support of the sound transmitting member or the record disc.

By virtue of this construction the tone arm of the pickup is engaged with the specific record groove of the record disc at a point before it reaches the starting point of the specific record groove.

Consequently this sound reproducing device assures correct and firm sound reproduction, particularly suitable for selective sound reproduction of a record disc having a plurality of record grooves.

7 Claims, 6 Drawing Figures

SOUND REPRODUCING DEVICE INCORPORATING A DEVICE FOR SELECTING A DESIRED RECORD GROOVE

BACKGROUND OF THE INVENTION

I. Field of the Invention

This invention relates to a sound reproducing device incorporating a device for selecting a desired record groove, and more particularly, to a sound reproducing device which includes a record disc having a plurality of recorded grooves on its face and a means for lowering the reproducing stylus of its pickup such that it is able to selectively reproduce any desired one of the recorded grooves desired.

II. Description of the Prior Art

Generally, sound reproducing devices, such as a simplified phonograph of the multitrack recording type are being widely used, because they are capable of reproducing several different items of the recorded sounds.

To say nothing of the type which permits a random selection of any recorded sounds, the device of the type which permits only an intentional selection of one of the specific items of the recorded sounds has a construction wherein a number of stoppers corresponding to the number of the record grooves are provided so as to be able to be operated from outside the casing of the casing of device for manual selection.

So far as the inventor's knowledge is concerned, Japanese patent publication No. 19763/76 is the one which discloses this kind of construction and this publication teaches that a fully mechanical construction can be used for the selecting mechanism.

According to the knowledge and experience of the inventor, this prior art invention is now being so widely used that there has arisen various demands for applying this device to general machines or apparatuses other than dolls or toys.

However, it was found that there exists some limiting conditions for applying this kind of selection device to such various kinds of apparatuses so long as it retains the same selecting mechanism.

In other words, this device has a plurality of stoppers disposed at pre-determined positions corresponding to each starting point of the record grooves and a projection protruding out from the marginal end face of the turn table at a fixed position with respect to the record disc. Pushing down of any one of the stoppers results in engagement of the stopper with the projection such that the turntable is stopped temporarily so as to locate the starting point of the selected record groove immediately below a reproducing stylus.

Due to this construction, the stoppers must project outside of the casing and, furthermore, the location of the stoppers cannot be changed due that must the relationship to be maintained between the starting points of sound reproduction and the projection as already mentioned.

The fact that the position of the stopper must be fixed and that a plurality of the stoppers of considerable length must project out of the casing not only makes it difficult to incorporate the stoppers in the device and to manipulate the stopper through the device, but also brings about another problem of neccessitating very complicated construction, high expense and possible trouble or malfunction when the stopper means is required to be remotely operated from another position.

The inventor of the present invention has aimed to expand the field of application of the prior invention.

In order to fulfill this intention, several electrical contacts have been incorporated in combination with novel mechanical constructions adapted to the electrical contacts.

SUMMARY OF THE INVENTION

An object of the present invention is to provide a selective reproduction type sound reproducing device to further expand the field of application of the sound reproducing device.

Another object of this invention is to maintain the construction of the sound reproducing device as simple as possible.

A further object of the invention is to provide a simplified phonograph of reasonably low price and which has a low possibility of malfunctioning.

A further object of the invention is to provide a sound reproduction device having a selective sound reproducing device for easy selection.

A still further object of the present invention is to provide a switch mechanism which is applicable to a sound reproducing device used for both a single groove record disc and a multitrack, or multigroove record disc.

According to the present invention, an electromagnetic actuator and a start switch for initiating a start signal are used in combination.

A rotary switch of the present invention consists of a plurality of fixed contacts each of which is located in a predetermined position corresponding to the starting point of the record groove on which the pickup of the tone arm is to be lowered, which position is predetermined by a relationship between the descent of the pickup and the direction of the rotation of the record disc such that the pickup of the tone arm can enter the specific record groove and a rotary contact which rotates along with the rotation of the record disc may in turn contact the fixed contacts.

Accordingly, when the rotary contact rotating with the record disc engages a specific fixed contact selected by the start switch, the rotary switch makes the electromagnetic actuator act so as to permit the pickup to descend toward the surface of the record disc and enter a specific track of a selected groove.

When the pickup is lowered on the record face and the reproducing stylus enters the selected record groove so as to start sound reproduction, the pickup begins travel toward the end point of sound reproduction. At the same time a normally open, self holding switch has already been closed by a slight movement of the pickup away from the starting point such that the circuit for energizing the motor is maintained even if an operator takes his hand off the start switch.

Descent of the pickup will cause an inhibitor switch, which had been previously closed for energizing the electromagnetic actuator before the pickup has descended, to open such that a movable blade of the electromagnetic actuator is permitted to return to its original position.

The electromagnetic actuator, is constructed to hold a sound transmitting member or the record disc in a nonacting position such that the distance between the record disc and the sound transmitting member which exerts stylus force or pressure to the pickup can be enlarged so that the pickup is kept at a position spaced apart from the record disc.

On the other hand, when the rotary contact blade of the rotary switch contacts a specific fixed contact, the electromagnetic actuator attracts its movable blade thereby releasing its support for the sound transmitting member or record disc.

Accordingly, the distance between the sound transmitting member and the record disc is reduced by a stylus force spring, such that a stylus pressure is imparted on the pickup.

As reproduction goes on and the pickup reaches the end point of sound reproduction at the central portion of the record disc, the pickup touches a swingably disposed return arm and urges it toward the center of the record disc to ride on an upwardly directed cam face.

Upon further rotation of the cam face together with the record disc, the cam face will scoop the return arm upward and the return arm will lift up the sound transmitting member through the cam face such that the sound transmitting member and the record disc move relatively away from each other.

Accordingly, the sound transmitting member and the record disc are relatively spaced apart thereby releasing the stylus force exerted on the pickup (tone arm) such that the pickup returns by the force of the return spring toward the starting point of sound reproduction.

The return arm itself is also returned to the starting point by a return spring wound therearound.

In this manner, the sound transmitting member or record disc has lost any support therefor and is now free to approach the other member. However, by this time the inhibitor switch has already been turned "off" and the movable blade of the electromagnetic is resiliently biased toward its original position and supports either the sound transmitting member or the record disc while maintaining the enlarged distance between the sound transmitting member and the record disc.

At this time the self holding switch is still restrained by the pickup (tone arm) so as to keep the circuit to the motor interrupted such that the motor stops.

In this way, the distance between the sound transmitting member and the record disc is maintained without any further approximation and the pickup having returned to the starting point of sound reproduction is still in a "stand by" position being out of engagement with the record disc.

As explained previously, the next rotation of the record disc initiated by the start switch will make the rotary contact blade of the rotary switch contact the fixed contact corresponding to the selected start switch. This results in initiation of the electromagnetic actuator with a suitable timing to release its restriction on the sound transmitting member or the record disc such that the pickup is allowed to descend and engage the selected specific record groove and exert a stylus force on the stylus of the pickup.

As explained heretofore, the present invention enables correct selection of any desired sound groove by utilizing the electrical contacts. More particularly, the present invention is effectively applicable to a sound reproducing device or devices capable of reproducing sounds in record discs having a plurality of record grooves, and therefore, has greatly expanded their market.

It is, of course, apparent that the device of this invention also can be applied to a record disc having a single record groove.

DETAILED DESCRIPTION OF THE PREFERRED EMBODIMENTS

Embodiment I

The drawings show examples of the construction of a sound reproducing device according to the present invention.

Figure 1:
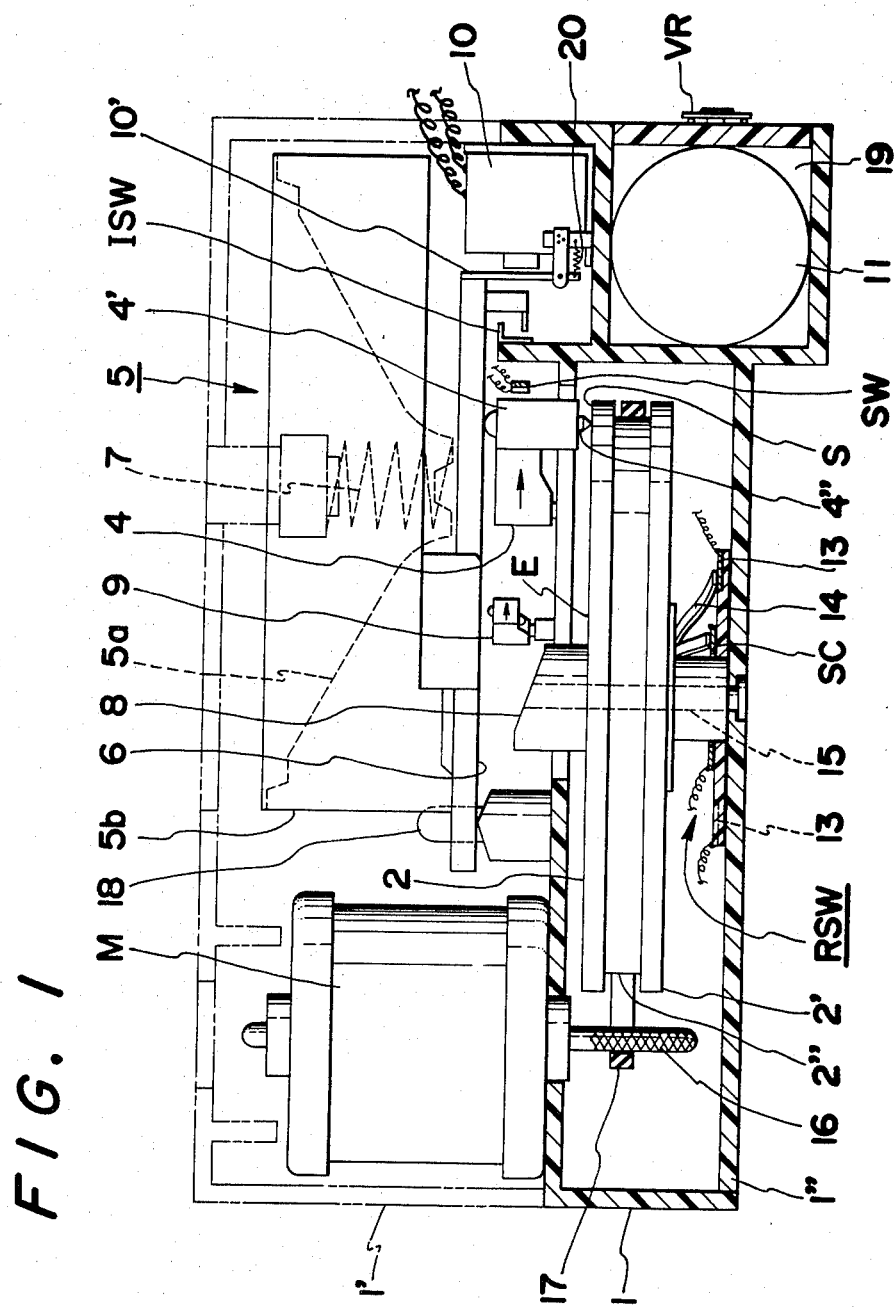
FIG. 1 is a cross sectional side elevational view showing a preferred embodiment of this invention.

In FIG. 1, numeral 1' denotes a casing and 1 is a chassis. A turn table 2' is rotatably carried on a base plate 1" of the chassis 1 by a center pin 15.

The turn table 2' is shown as having a construction wherein the upper face thereof constitutes a record disc, however, it is apparent that another type on which a separate piece of record disc is placed being capable of being rotatable together, namely, a changeable record disc type one can also be used.

The record disc 2 is formed with an annular peripheral groove around its side face, which constitutes a pulley groove 2".

A motor M is fixed to the chassis 1 at one end face so as to face its output shaft 16 toward the pulley groove 2" of the turn table 2'.

A resilient endless belt operating as a transmission means 17 is extended between and around the output shaft 16 of the motor M and the pulley groove 2" of the turn table 2'.

In this way, the turn table 2' is driven by the motor M to rotate the record disc 2.

Above the chassis 1, a speaker 5 is swingably supported in registry with the record disc 2 and is resiliently urged by a stylus force spring 7 toward the record disc 2 so as to be oscillated in upward and downward directions.

This speaker 5 may be of any well known type consisting of a speaker diaphragm or cone 5a, a cover member 5b surrounding the cone 5a and a sound transmitting member 6 connected to the bottom end of the cone 5a and disposed to carry thereon the entire speaker unit 5.

The sound transmitter member 6 is formed, at its one lengthwise end, with a longitudinally extending bifurcated portion, each of the tip ends of which is swingably attached to a mounting post 18 projecting upward on the chassis 1.

Also, a tone arm 4 having a pickup 4' at its tip end is pivotally attached to the chassis 1.

The pickup 4' is interposed between the record disc 2 and the sound transmitting member 6 of the speaker 5 and is allowed to be swung not only along the face of the record disc 2 but also slightly away from or close to the face of the record disc 2.

Figure 2:
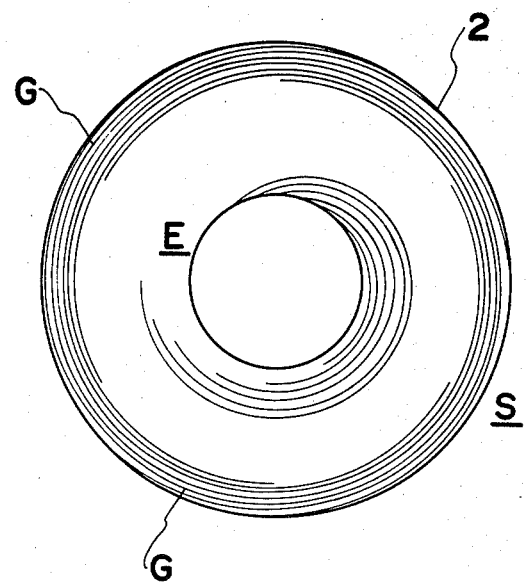
FIG. 2 is a plan view of a multigroove record disc.

The pickup 4 has a reproducing stylus 4" which is able to engage one of grooves G, FIG. 2, on the record disc 2 is arranged such that a certain amount of stylus force can be imparted by the stylus force spring 7 without fail.

Also, the tone arm 4 is biased by a return spring (not shown) in both directions, that is, one toward the starting point of sound reproduction S of the record disc as shown by an arrow and another where the pickup 4" moves away from the face of the record disc.

As shown in FIG. 2, the starting point S is located at the outer marginal portion of the face of the record disc 2.

Pivotally disposed on the chassis 1, is a return arm 9, the tip end of which is resiliently urged by a return spring (not shown) toward the outer marginal portion of the record disc as shown by an arrow and is located in the vicinity of the central portion of the record disc 2.

At the central portion of the record disc 2, an upright cam post is formed integral with the record disc 2 and the turn table 2'.

At the side of the chassis 1 opposite from where the motor M is mounted, an electromagnetic actuator 10 is fixedly attached, under which a battery magazine 19 is provided within which a dry cell or cells as an electric power source 11 are contained.

The electromagnetic actuator 10 incorporates therein what is called a "solenoid".

In the drawing, numeral 10' denotes a movable blade of the electromagnetic actuator 10, which is swingably received by a pin shaft and attached to an arm projecting forward from a side face of the electromagnetic actuator 10. The tip end of the movable blade is normally urged by a spring 20 toward the sound transmitting member 6.

In the FIG. 1, the sound transmitting member 6 is shown in a lowered or descent position, so that the movable blade 10' engages the side face of the sound transmitting member 6, while, when the transmitting member 6 is raised, the movable blade 10' is able to proceed further under the transmitting member 6 and hold it against the resilient force imparted by the stylus force spring 7.

In the drawing symbol SW designates a self holding switch which is adapted to be maintained open by being held by the pickup 4' of the tone arm 4 when the pickup 4' is positioned at the starting point of sound reproduction S and it closes when the pickup 4' moves slightly towards the end portion E of sound reproduction with the rotation of the record disc to start sound reproduction.

In the drawings, symbol ISW denotes an inhibitor switch for the electromagnetic actuator 10, which is arranged to close when the sound transmitter member 6 is lifted (refer to FIG. 3), and is opened when the sound transmitting member 6 takes a lowered position as shown in FIG. 1.

In the drawing VR denotes a variable resistor which regulates current flow to the motor M.

As shown in FIG. 2, six record grooves G are formed on the record disc 2 and their respective sound reproduction starting points S are positioned along the outermost marginal surface of the record disc 2.

Figure 4:
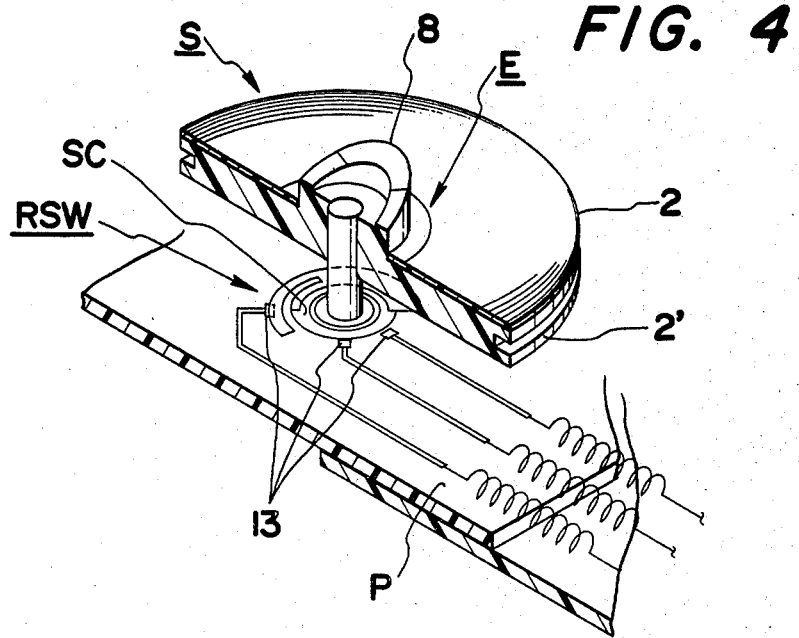
FIG. 4 is a partly fragmentary perspective view showing a rotary switch.

At the opposite side of this record disc 2, namely, under the turn table 2', a rotary switch RSW is attached. This rotary switch RSW consists, as can be clearly seen in FIGS. 4 and 5, of six fixed contacts 13 distributed on a printed base plate P fixed to the chassis 1 and along a circle of rotation and spaced apart from each other in such a manner that each of them electrically corresponds to each point predetermined for the pickup to be lowered before entering into the starting point of the selected record groove, and a rotary contact 14 fixed to the lower face of the record disc 2, namely, the turn table 2'.

The rotary contact 14 is bifurcated an outer tip which contacts during its rotation the fixed contacts 13 and an inner one tip which always contacts a slip ring contact SC also formed on the printed base plate P.

The following members, the rotary switch RSW, the inhibitor switch ISW, the self holding switch SW, a start switch ST, the electric power source 11 and the electromagnetic actuator 10 are connected to form an electric circuit.

As shown in FIG. 1, the motor M is connected to the power source 11 through the variable resistor VR and a transistor TR.

The transistor TR is connected at its emitter with the plus side and at its collector with the minus side of the power source through the motor M and the variable resistor VR.

Each one end of the six start switches ST and the self holding switch SW are connected in parallel through respective resistors R with the base of the transistor TR. The other end of each of these switches ST and SW is connected with the minus side of the electric power source 11.

Figure 5:
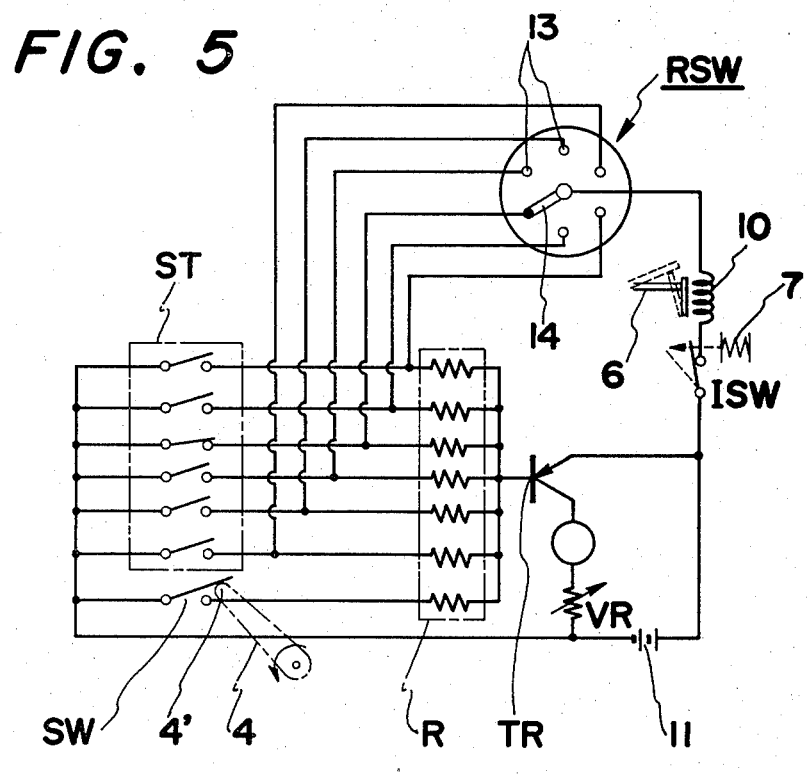
FIG. 5 is a circuit diagram of the invention.

As previously explained, the self holding switch SW opens by being retained by the pickup 4' when the tone arm 4 rests at its starting point of sound reproduction, and closes so as to effect self holding action when the pickup moves toward the end point of reproduction E shown by the arrow in FIG. 5.

The wiring between each start switch ST and the transistor TR is branched at the point between the start switch ST and the resistor R so as to be connected to each fixed contact 13 of the rotary switch RSW.

The rotary contact 14 of the rotary switch RSW, electromagnetic actuator 10 and the inhibitor switch ISW are connected in series with the plus pole of the power supply source 11.

As shown in FIG. 5, the device is in a state before starting sound reproduction. Assuming that the transmitting member 6 of the speaker 5 is held inclined upward by the movable blade 10' of the electromagnetic actuator 10, no stylus force is exerted on the pickup 4' and the self holding switch SW is opened by being held by the pickup 4' at its starting point of sound reproduction and the inhibitor switch ISW is closed.

If one selects and manually closes a third start switch ST from the top of the drawing, current will flow to the motor M through the transistor TR which causes the record disc begins to begin rotation which gives rise to a rotation of the rotary contact 14 of the rotary switch RSW.

As the fixed contact 13 of the rotary switch RSW has already been connected through the closed start switch ST to the minus side of the power source, the connection of the rotary switch RSW with the fixed contact 13 which is connected with the start switch will result in current flow to the electromagnetic actuator 10 such that the movable blade 10' is pulled by the actuator 10 to move in a position shown by a solid line thereby releasing the sound transmitting member 16 from the support by the movable blade 10'.

As a result, the sound transmitting member 6 is moved downward from its lifted position to the lowered position, and the inhibitor switch ISW is shifted, by means of the stylus force spring, from the position shown by the solid line to that shown by by the dotted line to open the circuit.

The movable blade 10' is now ready for reverting to its original position, but is held, by the lengthwise end face of the sound transmitting member 6, in a fixed position until the time when the sound transmitting member 6 will take its lifted position.

As explained above, the pickup 4' engages the record disc with appropriate timing selected by a specific start switch ST thereby permitting selection of a specific record groove as desired.

Figure 3:
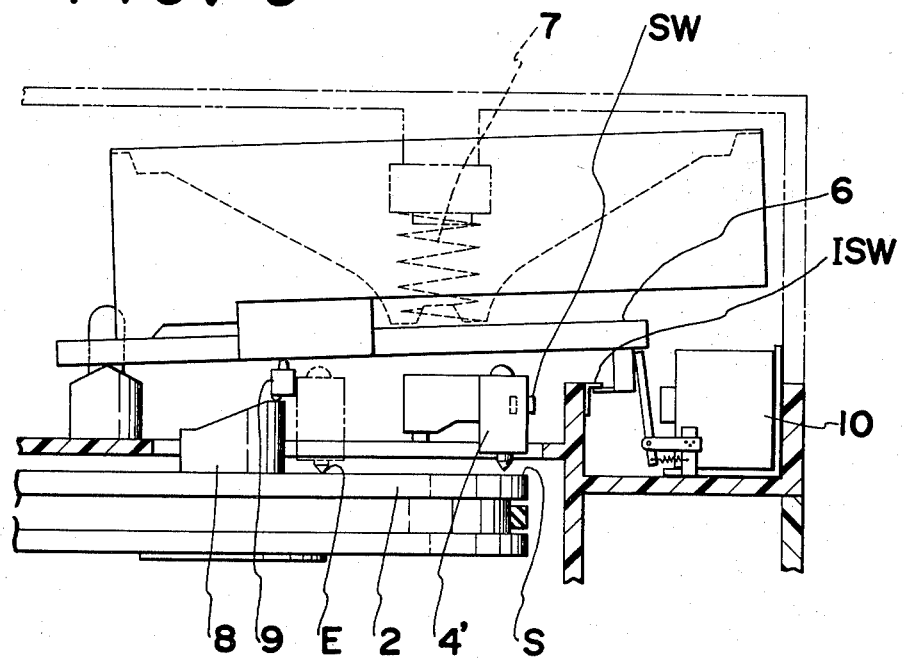
FIG. 3 is a cross sectional elevational view showing the operation of the device shown in FIG. 1.

As the sound reproduction goes on upto the point where the pickup 4' reaches the position shown by the dotted line in FIG. 3 (end point E), the pickup 4' pushes the return arm 9 toward the center to ride on the cam face of the upright cam post 8.

Upon further rotation of the cam post, the cam face will scoop up the return arm 9 which in turn will push the sound transmitting member 6 upward against the resilient force given by the stylus force spring 7 thereby releasing the pickup 4' from the stylus force.

Concurrently, the movable blade 10' of the electromagnetic actuator 10 reverts back to its original position by the force of the spring 20 and retains the sound transmitting member 6 in its lifted position.

Then the pickup 4' is able to revert to and rests at the starting point of sound reproduction S, the self holding switch SW opens and the inhibitor switch ISW will also close by being released from the restrainment by the sound transmitting member 6.

The return arm 9 also moves away from the engagement with the cam face to its original position.

In this way, the sound reproduction device has completed one reproduction operation and is now ready for next operation.

Embodiment II

Figure 6:
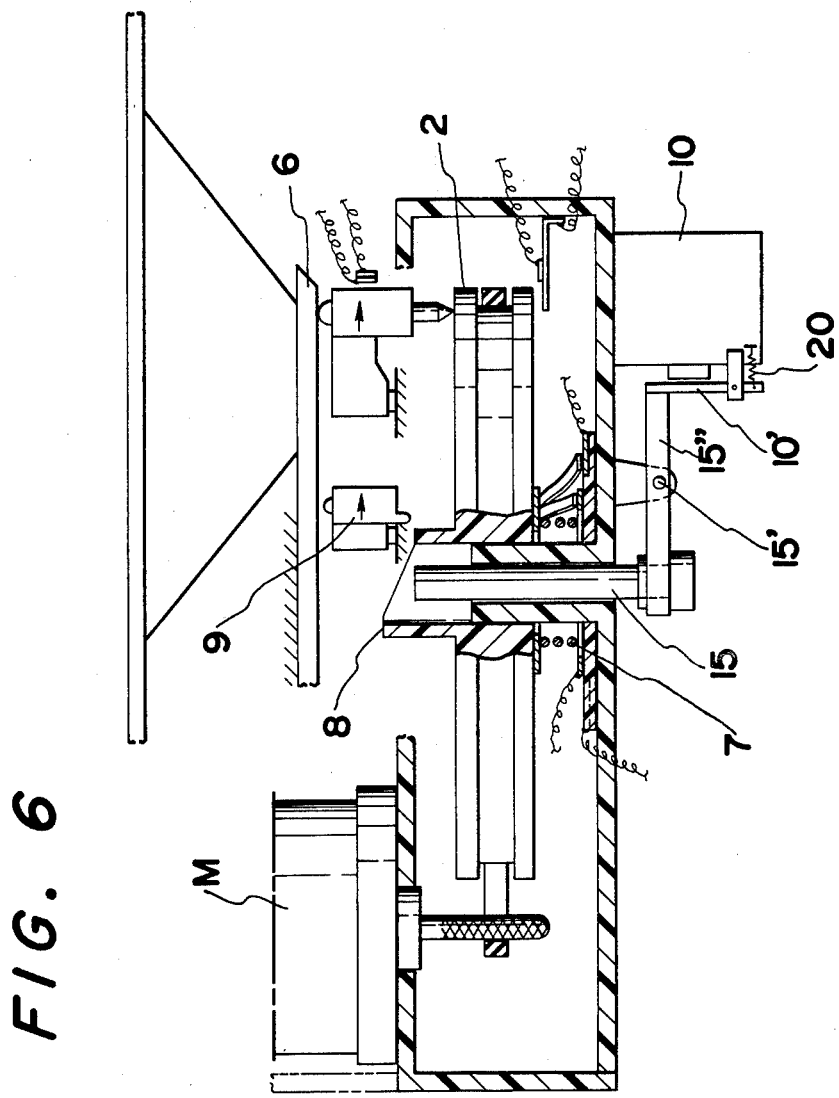
FIG. 6 is a cross sectional elevational view showing another embodiment of the sound reproducing device of the present invention.

FIG. 6 shows another embodiment wherein the record disc is movable up and down by the center pin 15 relative to a fixed sound transmitting member 6.

The center pin 15 is fixedly connected at its top end to the record disc 2 under which a stylus for a spring 7 is disposed in a compressed state.

When the return arm 9 is pushed to ride on the upright cam disposed at the center part of the record disc 2 and is then scooped by the upright cam 8, the record disc 2 will push the center pin 15, to which one end of the link 15" is connected by being supported by a fulcrum 15' to allow seesaw like swing motion.

The other end of the link 15" faces with the movable blade 10' of the electromagnetic actuator 10 so as to hold it.

As the remaining construction of the device of this embodiment is the same as that of the embodiment I, detailed explanation will not be repeated further.

I claim:

1. An improved sound reproducing device for selectively reproducing sounds recorded in a record disc being rotatably supported on a chassis and having an electric motor for driving said record disc when energized, a power source for energizing said motor, a tone arm swingably disposed on said chassis and resiliently urged toward the starting point of sound reproduction and away from the face of the record disc, a speaker, a sound transmitting member which is normally in contact with a side of said tone arm opposite to said record disc for transmitting reproduced sonic vibration to said speaker, a pickup forming a part of the tone arm and disposed between said transmitting member and said record disc, a stylus force spring for causing relative movement between said record disc and tone arm so as to produce a desired stylus force therebetween, a return arm disposed between said transmitting member and said record disc such that it is pushed by said tone arm upon the arrival of said tone arm at the end point of said sound reproduction path to ride on an upright cam disposed at the central portion of said record disc so as to enlarge the distance between said transmitting member and said record disc against the stylus force to thereby permit said tone arm to return to the starting point of said sound reproduction, wherein the improvement comprises:

an electromagnetic actuator having a movable blade which sustains said sound transmitting member or record disc against the stylus force of said stylus force spring and releasing said sound transmitting member or record disc when energized;

a switching transistor connected to said motor and said power source to form a first closed circuit when said transistor is turned on;

a self-holding switch connected between said transistor and said power source so as to turn on said transistor when said self-holding switch is closed, said self-holding switch being designed such that it is opened when said tone arm is at the starting point of said sound reproduction path but it is closed while said tone arm is moving toward the end portion of said sound reproduction path;

a manually operated start switch connected in parallel with said self-holding switch;

an inhibitor switch adapted to be closed and opened when the distance between said record disc and said sound transmitting member is beyond and below a predetermined value, respectively;

a rotary switch including a movable contact and a fixed contact;

said movable contact being adapted to rotate with the rotation of said record disc so as to successively make contact with said fixed contact, said fixed contact being disposed such that said fixed contact is disposed at a position with a predetermined positional relationship with a position at which a pickup of said tone arm descends so as to engage a selected recorded groove at a point slightly before the starting point of said sound reproduction path, said fixed contact further being correspondingly connected to said start switch so that said power source, said inhibitor switch, said electromagnetic actuator, said rotary switch and said start switch may form a second closed circuit through the selected start switch and the selected fixed contact corresponding to said start switch.

2. An improved sound reproducing device for selectively reproducing sounds recorded in a record disc as claimed in claim 1, wherein the record disc has a plurality of record grooves and the start switch comprises the corresponding number of switches.

3. An improved sound reproducing device for selectively reproducing sounds recorded in a record disc as claimed in claim 1, wherein the rotary contact of said rotary switch is bifurcated, one of the bifurcated ends successively engaging the fixed contact and the other end engaging a slip ring which is connected with said electromagnetic actuator.

4. An improved sound reproducing device as claimed in claim 3, wherein both the slip ring and the fixed contact are formed on a printed base plate.

5. An improved sound reproducing device for selectively reproducing sounds recorded in a record disc as claimed in claim 1, wherein the sound transmitting member is movably disposed to approach or move away from the face of the record disc, said stylus force spring is attached to said sound transmitting member such that it biases said transmitting member, and a movable blade of said electromagnetic actuator is adapted to hold said transmitting member.

6. An improved sound reproducing device for selectively reproducing sounds recorded in a record disc as claimed in claim 1, wherein said electromagnetic actuator is of a solenoid type.

7. An improved sound reproducing device as claimed in claim 1, wherein the record disc is movable in both upward and downward directions and said magnetic actuator is adapted to support the record disc through a center pin.

* * * * *

UNITED STATES PATENT AND TRADEMARK OFFICE
CERTIFICATE OF CORRECTION

PATENT NO. : 4,361,882
DATED : November 30, 1982
INVENTOR(S) : Katsumi Watanabe

It is certified that error appears in the above-identified patent and that said Letters Patent is hereby corrected as shown below:

On the title page Insert:

--(73) Assignee: Ozen Corporation, Tokyo, Japan --.

Signed and Sealed this

Twenty-fourth Day of May 1983

[SEAL]

Attest:

DONALD J. QUIGG

Attesting Officer

Acting Commissioner of Patents and Trademarks